United States Patent [19]
Lahme et al.

[11] 4,048,387
[45] Sept. 13, 1977

[54] SUBSTANCE AND DEVICE FOR THE ABSORPTION OF CATALYST POISONING GASES OUT OF THE OXYHYDROGEN GAS PRODUCED BY LEAD-ACID STORAGE BATTERIES

[75] Inventors: Norbert Wilhelm Lahme, Hoppecke; Gunter C. Sassmannshausen, Brilon, both of Germany

[73] Assignee: Accumulatorenwerk Hoppecke-Carl Zoellner & Sohn, Cologne, Germany

[21] Appl. No.: 541,394

[22] Filed: Jan. 16, 1975

Related U.S. Application Data

[63] Continuation of Ser. No. 382,201, July 24, 1973, abandoned.

[30] Foreign Application Priority Data

Aug. 2, 1972   Germany ............................ 2237950

[51] Int. Cl.² ...................... H01M 2/12; H01M 10/52
[52] U.S. Cl. ........................................ 429/50; 429/86; 423/210
[58] Field of Search ................ 136/179, 181; 423/210; 429/50, 86

[56] References Cited

U.S. PATENT DOCUMENTS

| 798,216 | 8/1905 | Scharff et al. | 423/210 |
|---|---|---|---|
| 2,615,062 | 10/1952 | Craig | 136/179 |
| 3,038,954 | 6/1962 | Pattison et al. | 136/179 |
| 3,102,059 | 8/1963 | Harmer | 136/181 |
| 3,701,691 | 10/1972 | Sasemannshousen et al. | 136/179 |

FOREIGN PATENT DOCUMENTS

| 2,008,218 | 9/1971 | Germany | |
|---|---|---|---|
| 1,175,301 | 8/1964 | Germany | 136/179 |

*Primary Examiner*—Donald L. Walton
*Attorney, Agent, or Firm*—Bacon & Thomas

[57] ABSTRACT

A substance, a method of producing it, and a device for using the substance in the absorption of catalyst poisoning gases out of the oxyhydrogen gas mixture produced by lead-acid storage batteries, the substance effecting the oxidation of the unstable catalyst poisoning gases $SbH_3$ and $AsH_3$ to produce hydrolysis-resistant intermetallic compounds. As absorbing substances are usable heavy-metal manganites, heavy-metal oxides and catalytic agents. As a device, the absorbing substance is combined with an oxygen and hydrogen recombination unit.

18 Claims, 1 Drawing Figure

U.S. Patent  Sept. 13, 1977  4,048,387
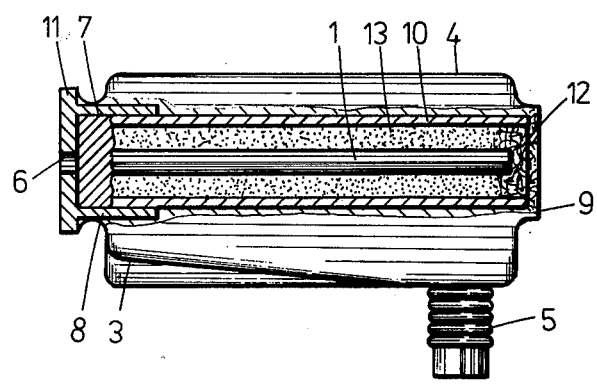

SUBSTANCE AND DEVICE FOR THE ABSORPTION OF CATALYST POISONING GASES OUT OF THE OXYHYDROGEN GAS PRODUCED BY LEAD-ACID STORAGE BATTERIES

This is a divisional of application Ser. No. 382,201 now abandoned filed July 24, 1973.

BACKGROUND OF THE INVENTION

1. Field of the Invention

The present invention relates to absorbing substances for the removal of catalyst poisoning gases, viz. the compounds of hydrogen with the elements of Group V of the Periodic Table of Elements, particularly with arsenic (As) and antimony (Sb), from the oxyhydrogen mixtures which are generated during the operation of lead-acid storage batteries. The invention further relates to methods of producing such absorbing substances, and to the application of such substances in combination with a special catalyst unit taking the place of a closure plug on a lead-acid storage battery, the purpose of this catalyst unit being to catalytically recombine the hydrogen and oxygen gases generated during the operation of the lead-acid storage battery to obtain water which is returned to the battery electrolyte.

2. Description of the Prior Art

It is known that considerable problems still exist in connection with the catalytic recombination of hydrogen and oxygen produced by lead-acid storage batteries, as a result of the poisoning of the active catalyst material through the gaseous compounds of antimony-hydrogen and arsenic-hydrogen, the so-called catalyst poisoning gases. These catalyst poisoning gases are produced through the reaction of hydrogen with certain alloy components of the lead used in the manufacture of lead-acid storage batteries. Primarily for reasons of improved quality, the lead alloys used for a wide variety of lead-acid storage cells frequently contain arsenic and antimony components. These alloy components combine with hydrogen to form the volatile, rather unstable, gaseous compounds of antimony hydride ($SbH_3$) and arsenic hydride ($AsH_3$), both being very effective as catalyst poisoning gases.

It has been variously attempted in the past to remove these so-called catalyst poisoning gases from the oxyhydrogen gas mixtures which are generated by electrical lead-acid storage batteries. For instance, on approach (U.S. Pat. No. 3,102,059) suggest that the oxyhydrogen gases, before reaching the catalyst, are made to flow over a granular bed of alumina or of a mixture of alumina and lead-dioxide on an alumina carrier. It is further known (U.S. Pat. No. 3,038,954) to arrange a bed of lead-oxide on a carrier of aluminum-oxide powder inside a battery plug in the flow path of the gases ahead of the catalytic material which recombines the hydrogen and oxygen generated by the battery. A particular shortcoming of these prior art substances is their very short span of effectiveness which can be measured in days.

SUMMARY OF THE INVENTION

It is a primary objective of the present invention to suggest an absorbing substance for the removal of the above-mentioned catalyst poisoning gases, especially of antimony-hydride and arsenic-hydride, from the oxyhydrogen gas mixtures which are generated in electrical lead-acid storage batteries during their operation, and to suggest a method of producing such absorbing substances, as well as an improved device for the catalytic recombination of the oxyhydrogen gases generated during battery operation to water, the improvement being aimed at a substantially increased duration of effectiveness of the catalyst.

The present invention proposes to attain the above objectives by suggesting as absorbing substances the use of heavy-metal manganites of one or several metals, preference being given to copper manganite. In place of this preferred group of compounds, it is also possible to use heavy-metal oxides for the removal of catalyst poisoning gases from the oxyhydrogen gas mixture generated by lead-acid storage batteries. For example, one may use the oxides of the elements iron, cobalt, nickel, tin, gallium, indium, and thallium, either separately or in combination, for a reaction with the antimony-hydride and arsenic-hydride to obtain hydrolysisresistant arsenides and antimonides in the form of intermetallic compounds. These heavy-metal oxides may also be employed in combination with the aforementioned heavy-metal manganites to obtain a suitable absorbing substance.

The present invention further proposes that the absorbing substance includes oxidic compounds of elements, either of one or several types, or as an additive to the heavy-metal oxides, these oxidic compounds being reduced in the reaction with the antimony-hydride and arsenic-hydride, under oxidation of the latter. Especially suitable for this purpose are: molybedenum trioxide ($MoO_3$), tungsten trioxide ($WO_3$), and manganese dioxide ($MnO_2$). Lastly, the invention suggests that the absorbing substance include oxides which are catalytically active as oxygen transfer agents, the oxides being used separately or in combination, or in addition to the heavy-metal oxides. Suitable examples of such oxygen transfer oxides are, in particular, ferric oxide ($Fe_2O_3$), vanadium pentoxide ($V_2O_5$), and chromium trioxide ($Cr_2O_3$). These oxygen transfer agents cause an oxidation of the antimony-hydride and arsenic-hydride, when they come in contact with these gases.

From the above, it can be seen that the various approaches to the basic solution proposed by the invention relate to different reaction mechanisms hich are operative in the reaction between the oxidic absorbing substances, and the antimony-hydride and arsenic-hydride. Thus, the first group of oxidic compounds produces antimonides and arsenides, while the two other groups produce oxidic compounds of antimony and arsenic. In the first case, the oxidation of the catalyst poisoning gases is obtained through the action of an oxidation agent, whereas the second case involves the catalytic transfer of oxygen. However, it should be understood that the foregoing explanation of the reaction mechanisms is based upon hypothetical assumptions which were reached as a result of the research underlying the present invention. The inventors, therefore, do not pretend that their hypotheses regarding the aforementioned reaction mechanisms are necessarily complete and correct. However, it has been found that each one of the substances listed herein materially contributed to an improved de-poisoning of the oxyhydrogen gas mixture which is given off in lead-acid storage batteries during operation. Particularly good results have been obtained with heavy-metal manganites, especially with copper manganite.

The present invention also suggests ways of improving the effectiveness of the aforementioned absorbing substances still further, by arranging the substance on a carrier material, preferably an alugel. The carrier itself is preferably in granular form, the grain size for use in conjunction with conventional automobile batteries ranging between 0.1 mm and 1 mm, and preferably between 0.2 mm and 0.5 mm.

The present invention further suggests a method of producing the absorbing substances mentioned earlier, the method being characterized in that a solution of a salt of the element, or elements, is produced which, in its oxidic form, reacts with antimony-hydride and arsenic-hydride to create antimonide or arsenide, or their oxides, respectively, and that the carrier material is introduced into this solution at an elevated temperature, that following a period of interaction, the mixture is introduced into a sodium carbonate solution or the like in order to precipitate the carbonate, and that the substance is then washed, dried, and calcinated. Preferred operating conditions for the method of the invention are listed in the various specific examples given further below.

Lastly, the invention suggest a novel device for the catalytic recombination of the hydrogen and oxygen gases produced during the operation of a lead-acid storage battery, to obtain water and to return the latter to the electrolyte of the battery. This device is characterized by a generally cylindrical housing which includes a stub connection on its outside and a porous body mounted against one housing face, ajacent to which is arranged a catalyst body, the latter being surrounded by a uniform layer of a granular absorbing substance contained inside a sleeve surrounding the catalyst body. The catalyst body is preferably in the shape of a rod and retained by its ends inside flanges in opposite end faces of the housing, whereby the flanges also serve to position the gas-permeable sleeve concentrically in relation to the catalyst rod, the annular space between the sleeve and rod containing the absorbing substance.

The gas-permeable sleeve is preferably of a ceramic material. However, it may also be in the form of a cylindrical screen, for example, a sleeve of wire mesh.

It was found to be advantageous to arrange one mounting flange in the housing as outwardly oriented extension, and to use a putty seal as a closure for the flange opening, the putty seal also serving to position and secure the catalyst rod, the absorbing substance, and the gas-permeable sleeve.

BRIEF DESCRIPTION OF THE DRAWING

Further special features and advantages of the invention will become apparent from the description following below, when taken together with the accompanying drawing which illustrates, by way of example, a preferred embodiment of the invention in the form of a catalytic recombination device, represented in the FIGURE as follows:

The FIGURE of the drawing illustrates in an elevational view, partially shown in longitudinal cross-section, a device embodying the invention.

DESCRIPTION OF THE PERFERRED EMBODIMENTS

Commerically available lead-acid batteries of the type 12 volts — 45 amp hours with 5 positive and 6 negative plates in each cell were used to test the novel absorbing substance of the invention. The grid of each cell plate was made of a lead alloy which contained approximately 5.5 percent antimony and 0.15 percent arsenic.

Each cell was closed hermetically by mounting in its opening a recombination device of the type illustrated in the drawing. The purpose of such a device it to recombine the hydrogen and oxygen gases generated during the operation of the battery to water. The recombination device includes a catalyst consisting of a catalyst carrier material, preferably palladium, the catalyst being provided in the form of a rod 1, or in some other suitable geometric form. The length of the catalyst rod 1 is several times larger than its diameter. This catalyst body is accommodated inside a housing 4 of plastic material which has a substantially semicylindrical cross section, the bottom 3 of housing 4 being inclined toward a downwardly extending hollow stub connection 5 through which the gas mixture enters into the housing and the recombined water returns to the electrolyte of the battery. One end face of housing 4 has a lateral opening 6, a porous body 7 surrounded by a plastic plug 11 closing the opening 6 against the outside. The plastic plug 11 includes an inwardly oriented hollow flange 8 extending into the housing 4 in the direction of an opposite end face. This opposite end face of the housing includes an outwardly extending flange 9 in alignment with flange extension 8 of the plastic plug 11. The catalyst rod 1 of the device extends between these two flanges 8 and 9, the opening of flange 9 being closed after assembly by a putty seal.

The porous body 7 consists of a ceramic mass which is made hydrophobic by a known treatment. The inside of housing 4 thus forms a convenient reaction space inside which the exothermic reaction of recombining the hydrogen and oxygen gases to water under the influence of the earlier-mentioned catalyst takes place.

In order to prevent the premature poisoning of the catalyst material, a ceramic tube 10 is arranged between the flange extension 8 and flange 9 of the housing in concentric arrangement with the catalyst rod 1 so as to provide an annular space around the latter. Within this annular space between tube 10 and the catalyst rod 1 is contained a granular bed of absorbing material 13, which thus surrounds the catalyst rod 1 in a uniform thickness. This bed of absorbing material 13 is preferably approximately 5 mm thick. The aforementioned batteries were subjected to a test in which they were overloaded with a current of 3 amps until the catalyst failed as a result of poisoning. Whenever a battery was exhausted, the test devices would be transferred to new batteries. The following absorbing substances have been tested:

| Substance | Effectiveness |
|---|---|
| Silicagel | 3 days |
| Alugel | 9 days |
| Various Microfilters | max. 7 days |

From the above listing, it can be seen that the effectiveness span of these materials is extraordinarily short.

However, it was found that if alugel, a commercially available type of alumina gel, is used as a carrier material for a heavy-metal oxide, a considerable improvement was achievable. The effectiveness in this case was extended to 483 days. This absorbing material was produced in the following manner:

EXAMPLE NO. 1.

A solution of 2.62 moles of $CuSO_4$ 135 $H_2O$ per liter was produced and into each liter of solution were introduced 0.66 kg of dried alugel, grain size 0.2 to 0.5 mm, at 80° C temperature. Following some reaction time, the mixture was introduced into a 5-percent sodim carbonate solution at 50° C temperature, whereupon the copper carbonate was precipitated. Following washing, drying and calcination at 350° C to 400° C, the substance was ready for use.

A markedly greater improvement of the effectiveness span was achieved through the use of heavy-metal manganites. Heavy-metal manganites containing for example, between 50 and 95 percent $MnO_2$ and, for example, between 5 and 40 percent CuO, with a corresponding admixture of $Co_3O_4$, $Ni_2O_3$, and $Ag_2O$, as well as mixtures of the aforementioned oxides, when prepared on an alugel carrier or some other suitable carrying material, are capable of increasing the longevity of the catalyst to in excess of 550 days. An absorbing substance of this type was produced as follows:

Example No. 2.

A solution of 1.50 moles per liter of $MnSO_4$—4 $H_2O$, 1.10 moles per liter of $CuSO_4$—7 $H_2O$, and 0.15 moles per liter of $NiSO_4$—7 $H_2O$ was prepared. Into 1 liter of this solution, heated at 80° C temperature, were introduced 0.66 kg of dried alugel, grain size 0.2 to 0.5 mm. Following a reaction time of 90 minutes (under occasional stirring), the mixture was introduced into 3 liters of a 5 to 10-percent solution of $Na_2CO_3$ at 50° C temperature, so that the corresponding combination carbonates where formed. Following a further reaction time of 30 minutes (under occasional stirring), the product was washed, dried and calcinated for 30 to 60 minutes as a temperature between 350° and 400° C, after which the substance was ready for use.

During the aforementioned calcination treatment, under simultaneous exposure to air, the manganese and copper combination carbonates would create copper manganites. The effectiveness span of this substance was found to be 578 days.

This remarkable improvement in the span of effectiveness has been confirmed in connection with other substances which are available in oxidic form, the primary characteristics developed through these research experiments and tests on absorbing substances capable of removing the hydrogen compounds of arsenic and antimony, elements of Group V of the Periodic Table of Elements, being the capability of forming arsenide and antimonide, respectively, with the component substances of the absorbing substance, and the capability of oxidation or of oxygen transfer of the component substances in the absorbing substance. As oxidation substances in this context should be understood those compounds which are reduced in reaction with $AsH_3$ and $SbH_3$. Oxygen transfer agents, on the other hand, are compounds whose catalytic effect produces the reaction of $AsH_3$ and $SbH_3$ with $O_2$.

Consequently, a suitable absorbing substance may be composed of oxides of elements which create hydrolysis-resistant arsenides and antimonides, or respectively, oxidic compounds of arsenic and antimony. As examples for such elements may be mentioned tin, nickel, cobalt, iron, copper, silver, gallium, indium, and thallium, but it should be noted that the hydrolysis-resistant arsenides and antimonides of these elements no longer possess the characteristics of a salt, but are presumably intermetallic compounds.

Apart from these oxides which are suitable for use as absorbing substances, other elements in oxidic form may be used which qualify as oxidation agents and oxygen transfer agents, such as for example: $V_2O_5$, $Cr_2O_3$, $Fe_2O_3$, $MoO_3$, and $WO_3$.

The aforementioned absorbing substances may be used separately or as a combination of several arsenide and antimonide forming substances, prepared either as a powder or in granular form, or as a preparation on a carrier material such as alugel, for example. Furthermore, these absorbing substances, in addition to containing the aforementioned arsenide and antimonide forming compounds, may be admixed to one or several oxidation agents or oxygen transfer agents in powder form or granular form, or used as a preparation on a suitable carrier such as alugel, for example. Lastly, these absorbing substances may be composed of one or several oxidation agents or oxidation transfer agents in powder form or granular form, or be in the form of a preparation on a suitable carrier material, such as alugel, for example.

It should be understood, of course, that the foregoing disclosure describes only preferred embodiments of the invention and that is is intended to cover all changes and modifications of these examples of the invention which fall within the scope of the appended claims.

We claim:

1. A device for the catalytic recombination of oxyhydrogen gas produced by a lead-acid storage battery into water and for returning the water to the battery electrolyte, comprising in combination:
   a generally gastight housing arranged above the battery electrolyte and connected with the space containing said electrolyte for gas flow communication and for liquid return flow thereto, said housing defining a cavity therein;
   a catalyst body mounted in the cavity of the housing, the catalyst body serving to catalyze said recombination of the oxygen and hydrogen gases into water;
   a gas permeable containing means positioned in the cavity, said containing means surrounding said catalyst body and being spaced therefrom to define a space therebetween, said containing means also being spaced from the inner wall of said housing, whereby oxyhydrogen gas in said housing cavity is provided access to the entire gas permeable containing means, and therefore, to the entire catalyst body; and
   a bed of an absorbing substance comprising a heavy metal manganite and being located in said defined space and surrounding the catalyst body, the absorbing substance serving to eliminate from the oxyhdrogen gas mixture catalyst poisoning gases comprising antimony-hydride and/or arsenic-hydride, which are generated together with the oxyhydrogen gases during battery operation.

2. A device as defined in claim 1, wherein:
   the housing is substantially cylindrical in outline, having an inclined bottom and including:
   a downwardly extending hollow stub connection at the lowest point of the housing bottom, two end faces, a horizontal opening in at least one of the end faces, and a porous body closing off the end face opening;
   the catalyst body is generally rod-shaped and extends horizontally between the two housing end faces so as to adjoin the porous body;
   the absorbing substance is granular in form; and the containing means for the absorbing substance is a generally tubular gas-permeable container arranged concentrically with the catalyst body axis so as to form a substantially uniform space around the latter for the accommodation of the bed of absorbing substance.

3. A device as defined in claim 2, wherein:
the gas-permeable container for the absorbing substance is a tube of ceramic material.

4. A device as defined in claim 2, wherein:
the gas-permeable container for the absorbing substance is a tube of wire mesh.

5. A device as defined in claim 2, wherein:
the housing includes a hollow plug which is mounted in said end face opening, the plug including a horizontally inwardly oriented flange extension, the flange extension positioning said porous body as well as one end portion of both the catalyst body and the container for the absorbing substance; and
the housing further includes on its opposite end face a second flange extension in alignment with the flange extension of said plug for the positioning of the other end portions of the catalyst body and the container for the absorbing substance.

6. A device as defined in claim 5, wherein:
the second flange extension of the housing is outwardly oriented; and
the housing further includes a putty seal in said second flange extension which closes the flange extension toward the outside and axially retains the catalyst body and the container for the absorbing substance.

7. The device as defined by claim 1, wherein said absorbing substance is copper manganite.

8. The device as defined by claim 1, wherein said absorbing substance comprises a heavy-metal manganite in combination with a heavy-metal oxide.

9. A device for the catalytic recombination of oxyhydrogen gas produced by a lead-acid storage battery into water and for returning the water to the battery electrolyte, comprising in combination:
a generally gastight housing arranged above the battery electrolyte and connected with the space containing said electrolyte for gas flow communication and for liquid return flow thereto, said housing defining a cavity therein;
a catalyst body mounted in the cavity of the housing, the catalyst body serving to catalyze said recombination of the oxygen and hydrogen gases into water;
a gas permeable containing means positioned in the cavity, said containing means surrounding said catalyst body and being spaced therefrom to define a space therebetween, said containing means also being spaced from the inner wall of said housing, whereby oxyhydrogen gas in said housing cavity is provided access to the entire gas permeable containing means, and therefore, to the entire catalyst body; and
a bed of an absorbing substance consisting essentially of an oxide of copper located in said defined space and surrounding the catalyst body, the absorbing substance serving to eliminate from the oxyhydrogen gas mixture catalyst poisoning gases comprising antimony-hydride and/or arsenic-hydride, which are generated together with the oxyhydrogen gases during battery operation.

10. In a method for catalytically recombining into water the oxyhydrogen gas produced during operation of a lead-acid storage battery, said gas containing antimony and arsenic impurities, including the step of contacting said oxyhydrogen gas with a catalyst suitable for catalyzing recombination of said gas into water, the improvement which comprises the step of contacting said oxyhydrogen gas, prior to contacting said catalyst, with a composition suitable for eliminating said impurities, comprising a heavy-metal manganite.

11. The process as defined by claim 10, wherein said heavy metal manganite is copper manganite.

12. The process as defined by claim 11, further comprising a particulate alumina gel carrier for said impurity-eliminating composition.

13. The process as defined by claim 10, wherein said impurity-eliminating composition comprises a heavy-metal manganite in combination with a heavy-metal oxide.

14. The process as defined by claim 10, wherein said impurity-eliminating composition further comprises a carrier material.

15. The process as defined by claim 14, wherein said carrier is an alumina gel.

16. The process as defined by claim 14, wherein said carrier has an average particle size of between about 0.1 and 1mm.

17. The process as defined by claim 16, wherein said lead-acid storage battery is an automotive battery and said average carrier particle size is between about 0.2 and 0.5 mm.

18. The process is defined by claim 13, wherein said heavy metal oxide is an oxide of copper or an oxide of iron.

* * * * *